FLUID LOGIC DEVICE

Filed Sept. 4, 1963 2 Sheets-Sheet 1

INVENTORS
EUGEN GROEBER
GALE H. THORNE, SR.
BY H P Terry
ATTORNEY

Aug. 16, 1966 E. GROEBER ETAL 3,266,507

FLUID LOGIC DEVICE

Filed Sept. 4, 1963 2 Sheets-Sheet 2

INVENTORS
EUGEN GROEBER
GALE H. THORNE, SR.
BY H P Ferry
ATTORNEY

United States Patent Office 3,266,507
Patented August 16, 1966

3,266,507
FLUID LOGIC DEVICE

Eugen Groeber and Gale H. Thorne, Sr., Salt Lake City, Utah, assignors to Sperry Rand Corporation, Great Neck, N.Y., a corporation of Delaware
Filed Sept. 4, 1963, Ser. No. 306,484
2 Claims. (Cl. 137—81.5)

The present invention relates to fluid control apparatus and particularly to fluid logic devices of the type suitable for use in fluid digital computer systems. More particularly, the present invention provides for fluid logic AND as well as memory devices.

Prior digital computers included logic elements that were either electrically or mechanically operated. The electronic elements suffer from the disadvantages of being relatively delicate, sensitive to environmental conditions and relatively expensive while the mechanical elements include moving parts which tend to malfunction and have high inertia characteristics.

It is an object of the present invention to provide fluid logic apparatus for controlling fluid flow without utilizing moving parts.

It is another object of the present invention to provide fluid logic apparatus which produces logic functions which does not require moving parts and is not sensitive to environmental conditions.

It is a further object of the present invention to provide a simple fluid logic apparatus which provides an AND function.

It is an additional object of the present invention to provide a simple fluid logic apparatus which provides a memory function.

The above objects are achieved by fluid logic apparatus utilizing three fluid logic elements in which each has a power stream and a control stream. A pair of the elements are symmetrically arranged with their output channels merging into a common output channel connected to form the control stream of the third element. By properly controlling the power stream in accordance with control stream signals, an AND or a memory function is provided.

Figure 1:
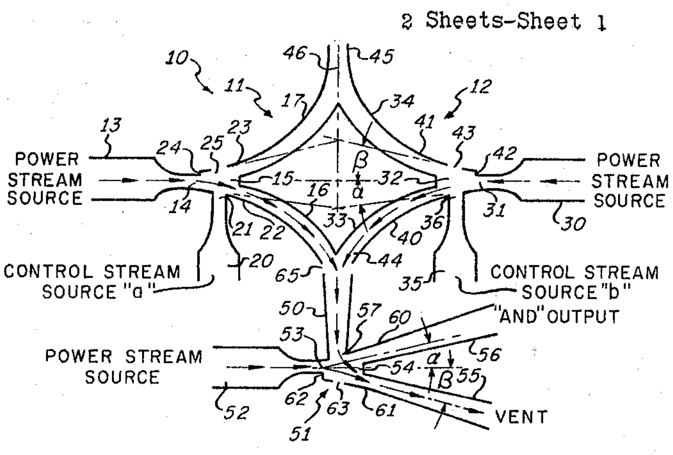
Figure 2:
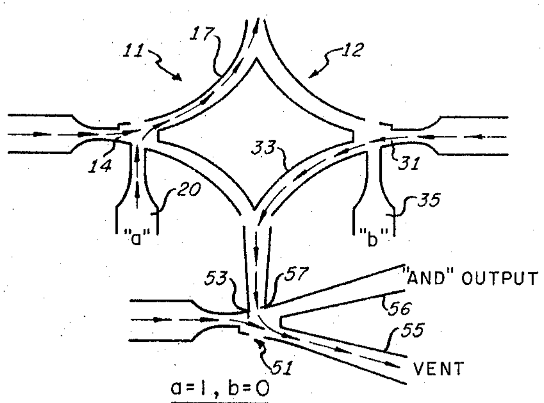
Figures 3, 4:
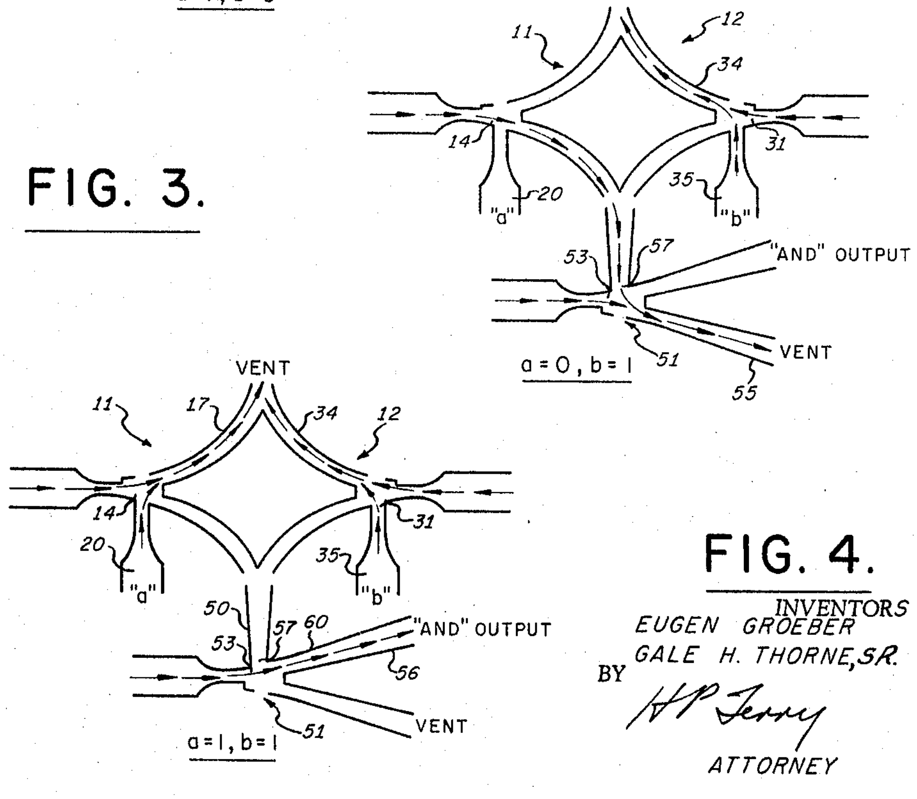
Figure 5:
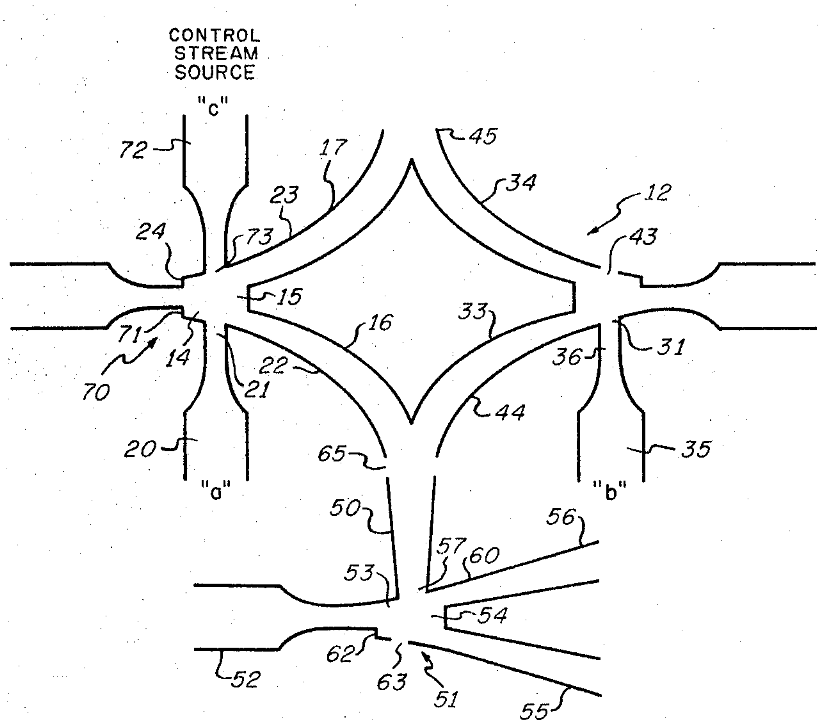

These and other objects of the present invention will become apparent by referring to the drawings in which FIG. 1 is a schematic diagram of a pure fluid logic AND device incorporating the present invention;

FIGS. 2, 3 and 4 are similar to FIG. 1 and show sequential steps in the operation thereof; and FIG. 5 is a schematic diagram of a pure fluid logic memory device incorporating the present invention.

The pure fluid logic AND device 10 consists of a pair of similar monostable elements 11 and 12. The monostable element 11 has a power stream input channel 13 terminating at an orifice 14 in a chamber 15 formed by the intersection of first and second diverging output channels 16 and 17. The other end of the power stream input channel is connected to a power stream fluid pressure source as indicated by the legend. The orifice 14 of the input channel 13 defines a path of power stream fluid flow. The element 11 also includes a control signal channel 20 terminating at an orifice 21 in the chamber 15 which defines a path of control stream fluid flow that is cooperative with the power stream.

The output channels 16 and 17 are so arranged with respect to the chamber 15 and the power stream that the power stream normally "attaches" to the outside wall 22 of the first output channel 15 and thereby tends to flow through the first output channel 15 in the absence of a control stream fluid flow. The power stream attaches to the wall 22 because of the Coanda effect which provides a stable dynamically formed and sustained pressure gradient across the power stream which keeps the power stream affixed to the wall 22. The "attachment" of the power stream to the wall 22 is sustained by the action of the power stream in entraining air into the power stream. Near the wall 22, the entrained air cannot be replaced due to the smooth, continuous adjacent surface forming the wall 22, which results in the dynamic effect of pressure reduction in the boundary layer. On the opposite side of the power stream, the outside wall 23 of the second output channel 17 is constructed so that there is no close interference of a boundary, and fluid is more freely replaced as the power stream entrains the nearby fluid. The net effect is to provide a transverse pressure gradient across the power stream which keeps the power stream flowing next to the wall 22 in the absence of a control stream and provides the element 11 with its monostable characteristic.

This effect may be enhanced by arranging the outside wall 22 to have a smaller setback than setback 24 of the opposite sidewall 23 or by having a substantially continuous smooth surface (as shown) from the orifice 14 to the channel 16 while the outside wall 23 of the channel 17 has a larger setback 24. Further, the outside wall 23 may be vented to the ambient pressure by an opening 25. In addition, the channel 16 may be disposed at a shallower angle $\alpha$ with respect to the power stream than the channel 17 which may be at a greater angle $\beta$. Any combination of these effects may be used to cause the power stream to flow through the output channel 16 in the absence of a control stream signal.

In a similar manner, the monostable element 12 has a power stream input channel 30 terminating at an orifice 31 in a chamber 32 formed by the intersection of first and second diverging output channels 33 and 34. The other end of the input channel 30 is connected to a power stream fluid pressure source as indicated by the legend. The element 12 further includes a control signal channel 35 terminating at an orifice 36 in the chamber 32. The power stream and control stream flows into the chamber 32 are defined by their respective orifices 31 and 36 and they are cooperative in the manner explained above with respect to the element 11.

The output channels 33 and 34 are so arranged that the power stream from the orifice 31 normally attaches to the outside wall 40 of the first output channel 33 and thereby tends to flow through the channel 33 in the absence of a control stream from the orifice 36. To enhance the attachment effect, the outside wall 40 of the output channel 33 may have a substantially continuous smooth surface from the orifice 31 to the channel 33 or a smaller setback than the setback 42 or a vented opening 43 in the outside wall 41 as previously explained with respect to the element 11. Also the channel 33 may be disposed at a shallower angle $\alpha$ with respect to the power stream than the channel 34 at the larger angle $\beta$.

The control signal channels 20 and 35 are connected to fluid control stream signal input sources *a* and *b* respectively as indicated by the legends. The control stream issuing from either orifice 21 or 36 may be a steady continuous stream or be pulsed for short periods of time. The control stream issues at relatively low pressure and at an angle to the power stream and causes a dual effect when it impinges upon the power stream. First, it tends to negate the Coanda effect due to the introduction of a pressure function adjacent the outside wall 22 or 40 where the power stream is attached. Second, the control stream imparts momentum to the power stream. The result is rapid deflection of the trajectory of the power stream whereby the power stream tends to flow through the second output channel 17 or 34.

The diverging output channels 16 and 17 of the element 11 and the diverging output channels 33 and 34 of the element 12 are so arranged that the first output channels 16 and 33 gradually turn and asymptotically merge into a first common output channel 44. Similarly, the second output channels 17 and 34 merge into a second common output channel 45. The first common output channel 44 is connected to a control signal channel 50 of a third monostable element 51. The monostable element 51 is similar to the monostable elements 11 and 12, in that it also includes a power stream input channel 52 terminating at an orifice 53 in a chamber 54 formed by the intersection of first and second diverging output channels 55 and 56. The output channel 56 provides the AND function. The other end of the input channel 52 is connected to a power stream fluid pressure source as indicated by the legend. The control signal channel 50 terminates at an orifice 57 in the chamber 54. The flow of the power stream and control stream into the chamber 54 is defined by their respective orifices 53 and 57 and they are cooperative in the manner explained above with respect to the element 11.

The output channels 55 and 56 are so arranged that the power stream from the orifice 53 normally attaches to the outside wall 60 of the output channel 56 and thereby tends to flow through the channel 56 in the absence of a control stream from the orifice 57. The attachment effect may be enhanced by any of the methods explained above, with respect to the elements 11 and 12, i.e., the outside wall 61 of the output channel 55 may have a setback 62 or a vented opening 63 or the channel 56 may be disposed at a shallower angle $\alpha$ with respect to the power stream than the channel 55 at the larger angle $\beta$.

In operation, as shown in FIG. 1, in the absence of signal inputs *a* and *b* to the control channels 20 and 35, respectively, the power streams from the orifices 14 and 31 attach to the outside walls 22 and 40 associated with the outlet channels 16 and 33, respectively, as indicated by the arrows from the reasons given above. The power streams from the elements 11 and 12 provide a control stream issuing from the orifice 57 of the element 51 which causes the power stream of the element 50 to be deflected or to flip to the output channel 55. Thus, in the absence of signal inputs *a* and *b* to the control channels 20 and 35, there is no output from the AND output channel 56.

As shown in FIG. 2, in the event a signal input *a* is applied to the control channel 20 but no signal input *b* is applied to the control channel 35 there is still no output from the AND channel 56 because although the power stream issuing from the orifice 14 of the element 11 is deflected or flipped to flow through the output channel 17, the power stream issuing from the orifice 31 of the element 12 continues to flow through the output channel 33 thereby providing a control stream issuing from the orifice 57 of the element 51 which continues to deflect the power stream issuing from the orifice 53 to flow through the output channel 55.

Similarly, as shown in FIG. 3, with a control signal input *b* applied to the control channel 35 but no signal input *a* applied to the control channel 20 although the power stream issuing from the orifice 31 of the element 12 is deflected to flow through the output channel 34; the power stream from the orifice 14 of the element 11 continues to provide a control stream issuing from the orifice 57 of the element 51 which deflects the power stream from the orifice 53 to flow through the output channel 55.

As shown in FIG. 4, with signal inputs *a* and *b* applied to the control channels 20 and 35, respectively, the power streams from the orifices 14 and 31 are deflected to flow through the outlet channels 17 and 34, respectively, as indicated by the arrows. Since there is no flow into the control channel 50 of the element 51, the power stream issuing from the orifice 53 attaches to the wall 60 due to Coanda effect explained above and flows through AND output channel 56 to provide an AND output function.

The truth table of this fluid logic AND device is as follows:

| *a* | *b* | "AND" Port |
|---|---|---|
| 0 | 0 | 0 |
| 1 | 0 | 0 |
| 0 | 1 | 0 |
| 1 | 1 | 1 |

Referring again to FIG. 1, the common outlet channel 44 may pass through an open gap 65 or be vented prior to entering the control signal channel 50 to avoid feedback pressures in the outlet channels 16 and 33 and to disburse any excessive air.

In order to provide a variable fluid logic memory device, as shown in FIG. 5, the monostable element 11 is replaced by a bistable storage element 70. The bistable storage element 70 is similar to the monostable element 11 and has similarly numbered components and is connected with respect to the monostable elements 12 and 51 as described above with the following exceptions:

(1) to provide the bistable characteristic the vent 25 is eliminated, the wall 22 has a setback 71 identical to the set back 24 and the output channels 16 and 17 are disposed at equal angles with respect to the power stream issuing from the orifice 14 in order that the power stream arbitrarily flows through the output channel 16 or 17 in the absence of a control stream, (2) the control stream input source *a* provides a set function, and (3) the element 70 further includes a control signal channel 72 terminating in an orifice 73 in the wall 23 of the chamber 15 and its control stream signal input source *c* provides a reset function. The element 12 is a select element while the element 51 is a readout element.

In the reset mode of operation, the reset control signal input provides a control stream which issues from the orifice 73 and causes the power stream issuing from the orifice 14 to be deflected and flow through the output channel 16 into the control signal channel 50. The control stream issuing from the orifice 57 deflects the power stream issuing from the orifice 53 to flow through the output channel 55 thereby causing no output from the readout channel 56. During the reset mode of operation, there is no control signal input to the set control signal channel 20 or to the read control signal channel 35. The power stream issuing from the orifice 31 flows through the output channel 33 and into the control signal channel 50 to aid in deflecting the power stream issuing from the orifice 53 to flow through the output channel 55.

In the set mode of operation, there is no reset control signal input but the set control signal input into the set control channel 20 provides a control stream which issues from the orifice 21 to deflect the power stream issuing from the orifice 14 to flow through the output channel 17. Since there is no read input signal, the power stream issuing from the orifice 31 continues to flow through the output channel 33 into the control channel 50 to provide a control stream issuing from the orifice 57 which deflects the power stream issuing from the orifice 53 to flow through the output channel 55, thereby continuing to provide no output signal from the readout output channel 56.

In the read mode of operation with neither reset nor set signals applied, the power stream issuing from the orifice 14 continues to flow through the output channel 17. With a read signal applied to the control channel 35, a control stream issues from the orifice 36 which deflects the power stream issuing from the orifice 31 causing it to flow through output channel 34. With no input flow to the control channel 50, the power stream issuing from the orifice 53 tends to flow through the readout output channel 56 due to the Coanda effect of the monostable element 51 thereby providing a readout signal. The truth table of practical combinations of the fluid logic memory device is as follows:

| | Read | Set | Reset | Readout |
|---|---|---|---|---|
| A | 0 | 0 | 0 | 0 |
| B | 0 | 0 | 1 | 0 |
| C | 0 | 1 | 0 | 0 |
| D | 1 | 0 | 1 | 0 |
| E | 1 | 1 | 0 | 1 |

It will be appreciated that the apparatus of the present invention may be inexpensively manufactured of laminae with the fluid logic device 10 being stamped or cut of an intermediate sheet of material such as metal or plastic that is sandwiched between two other sheets of similar material which form the upper and lower enclosures to define the channels, etc. Alternatively, ceramic or plastic tubing or other suitable conduits may be readily molded to form the channels, etc. to provide an inexpensive, compact and extremely reliable fluid logic element.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A pure fluid logic device comprising, (a) first, second, and third fluid logic elements, (b) said first element being bistable and having a power stream input channel, first and second opposed control stream input channels, first and second output channels each defining a path of fluid flow, and a chamber formed by the intersection of said input and output channels, (c) said second and third elements being monostable and having a power stream input channel, a control stream input channel, first and second output channels each defining a path of fluid flow, and a chamber formed by the intersection of said input and output channels, (d) said first output channels of said first and second elements being connected to provide a first common output channel, (e) said second output channels of said first and second elements being connected to provide a second common output channel, and (f) said first common output channel being coupled to said control stream input channel of said third element, said third element being monostable in that its power stream tends to attach to said first output channel associated with its control input channel.

2. A pure fluid logic device as recited in claim 1 further including, (a) means for applying a power stream to each of said power stream input channels, and (b) means for applying a control stream to said first control channel of said first element in accordance with reset signals, (c) means for applying a control stream to said second control input channel of said first element in accordance with said control signals, (d) and means for applying a control stream to said control input channel of said second element in accordance with read control signals.

References Cited by the Examiner

UNITED STATES PATENTS

| | | | |
|---|---|---|---|
| 3,107,850 | 10/1963 | Warren et al. ---- | 137—81.5 X |
| 3,117,593 | 1/1964 | Sowers ----------- | 137—81.5 X |
| 3,175,569 | 3/1965 | Sowers ---------- | 137—81.5 X |

M. CARY NELSON, *Primary Examiner.*

S. SCOTT, *Assistant Examiner.*